United States Patent [19]

Okazaki

[11] Patent Number: 5,684,704
[45] Date of Patent: Nov. 4, 1997

[54] IN-CAR NAVIGATION APPARATUS

[75] Inventor: Katsuzi Okazaki, Tokyo, Japan

[73] Assignee: Mitsubishi Denki Kabushiki Kaisha, Tokyo, Japan

[21] Appl. No.: 548,264

[22] Filed: Oct. 25, 1995

[30] Foreign Application Priority Data

Jan. 20, 1995 [JP] Japan .................. 7-007790

[51] Int. Cl.$^6$ .................................................. G05D 1/00
[52] U.S. Cl. ...................... 364/444.2; 364/424.029; 364/444.1
[58] Field of Search .................. 364/444, 449, 364/424.02, 424.027, 424.029, 444.1, 444.2, 449.1, 449.3, 449.4, 449.5, 449.6, 449.7

[56] References Cited

U.S. PATENT DOCUMENTS

| | | | |
|---|---|---|---|
| 5,170,352 | 12/1992 | McTamaney et al. | 364/424.02 |
| 5,170,353 | 12/1992 | Verstroete | 364/444 |
| 5,204,817 | 4/1993 | Yoshida | 364/449 |
| 5,274,560 | 12/1993 | LaRue | 364/444 |
| 5,410,485 | 4/1995 | Ichikawa | 364/444 |
| 5,488,559 | 1/1996 | Seymour | 364/449 |
| 5,515,283 | 5/1996 | Desai et al. | 364/443 |

FOREIGN PATENT DOCUMENTS 6-131592  10/1992  Japan .

OTHER PUBLICATIONS

"Determination of Minimum Cost Paths"—IEEE Trans. vol. ssc-4, No. 2 Jul. 1968 —Hart et al, pp. 100–107.
"Studies in Semi–Admissible Heuristics"—IEEE Trans., vol. PAMI–4, No. 4 Jul. 1982 — Pearl et al, pp. 392–399.

Primary Examiner—Kevin J. Teska
Assistant Examiner—Stephen J. Walder, Jr.

[57] ABSTRACT

An in-car navigation apparatus capable of searching an optimal or a quasi-optimal route always, and further capable of shortening the waiting time until a route is obtained, has an operating section which receives a starting point, a destination and searching conditions for searching from a handling section to read digital map data to be used for searching from the map database section of the apparatus. The operating section holds a plurality of weighting factors of each heuristic term to be used in an evaluation function or computing formulae to be used for the evaluation function, and searches an optimal or a quasi-optimal route by selecting an appropriate one in accordance with the road conditions and the searching conditions of the map data read in when searching is performed.

19 Claims, 6 Drawing Sheets

IN-CAR NAVIGATION APPARATUS

BACKGROUND OF THE INVENTION

1. Field of the Invention

This invention relates to an in-car navigation apparatus for searching an optimal route between two appointed points on a road map, the digital data of which have a hierarchy construction, by means of a heuristic algorithm.

2. Description of the Prior Art

FIG. 9 is a block diagram showing the construction of a conventional in-car navigation apparatus disclosed in, for example Japanese Published Unexamined Patent Application No. 131592/'94 (Tokkai-Hei 6-131592). In the figure, reference numeral 1 denotes a position detecting section for detecting the present position of a car. Reference numeral 2 denotes a map database section using a medium capable of storing information with large capacity such as picture data for displaying a map, digital map data for searching, etc.; for example a CD-ROM can be used as the medium. Reference numeral 3 denotes a handling section with which a user inputs a destination, a condition for searching, a condition for displaying a picture, or the like. Reference numeral 4 denotes an operating section for searching an optimal route from a starting point to a destination both of which are set by a user with the handling section 3 on the digital map data read in from the map database section 2 in conformity with a set condition. Reference numeral 5 denotes a displaying section for displaying picture data at a necessary area which are read in from the map database section 2, for drawing a car mark at a position corresponding to the present position of a car detected by the position detecting section 1 in the displayed picture, and for displaying a route mark along a route searched by the operating section 4; the displaying section 5 using a display such as a liquid crystal display, or the like.

In operation, such an in-car navigation apparatus is constructed to search an optimal route from an appointed starting point to an appointed destination for guiding a car when a user requires the optimal route by appointing the starting point and the destination for searching the route with the handling section 3 while referring to a map displayed on the screen of the displaying section 5. The digital map data stored in the map database section 2 and to be used for route-searching is composed of characteristic points on roads called nodes (such as intersections, route-changing points and the like) and links connecting each node.

The operating section 4 searches a route between the starting point and the destination set on the digital map data stored in the map database section 2, and pursues links connected to a link including the node s of the starting point successively from the node s until it arrives at the node o of the destination by gradually expanding the range of searching. During this operation, the evaluation functions of each node being in the sphere searched yet are computed to be pursued from a node having smaller evaluation functions in order.

If algorithms in which the range of searching is expanded in all directions equivalently such as a transverse type searching method, Dijkstra method or the like are used for computing the evaluation functions, the range of searching becomes a circle the center of which is the node s of a starting point, and the opposite directions are widely included in the circle, which increases the computation time required for searching. Accordingly, a method for decreasing the searching time by preferentially searching areas toward a destination by means of a heuristic algorithm such as algorithm A disclosed in, for example an article by Hart and Nilsson titled "A Formal Basis for the Heuristic Determination of Minimum Cost Paths", IEEE Transactions of Systems Science and Cybernetics, Vol. SSC-4, No. 2, pp. 100–107, is used.

In the algorithm A, an evaluation function f(n) at a node n is obtained in conformity with the following formula.

$$f(n)=g(n)+h(n) \quad (1)$$

where g(n) is the cost of an optimal route from a node s of a starting point to the node N, and h(n) is called a heuristic term and is the estimated cost from the node n to the node o of a destination.

In case of searching a route having the shortest length, the cost g(n) can be obtained as the length of a route from the node s of a starting point to the node n, namely the sum of all links included in the route.

If it is ensured that the heuristic term h(n) is smaller than the actual minimum route cost from the node n to the node o of a destination, it is ensured that the minimum route can be searched by using the algorithm A; the algorithm A in this case is especially called algorithm A*. In this case, since the length of a route connecting two points is always longer than the length of a straight line connecting the two points, the heuristic term h(n) is ordinarily obtained as the length of a straight line connecting the node n and the node o of a destination.

In the searching using the algorithm A*, the nearer the heuristic term h(n) is to the actual cost from the node n to the node o of a destination, the better the efficiency of the searching is and the shorter the time for the searching becomes. Now, a weighting factor k of a heuristic term h(n) given by the following formula is introduced.

$$k=\text{(the actual cost from the node n to the node o)}/h(n) \quad (2)$$

If roads are distributed uniformly, the weighting factor k of the heuristic term h(n) can generally be supposed to have an almost constant value independent of the node n. FIG. 10 is a diagram showing the transition of the extent of searching in case of performing the searching from the node s of a starting point to the node o of a destination by using the value of k as a parameter when the values of k at every node in the extent of searching are supposed to be constant. As apparent from the figure, the extent of searching becomes wider in accordance with the increasing of the values of the weighting factor k of the heuristic term h(n), and the efficiency of the searching becomes worse.

When k=1, the heuristic term or the estimated cost completely agrees with the actual cost, and only the nodes on the optimal routes are the objects to be searched. In this case, the efficiency of searching becomes maximum. On the other hand, when k=∞, the extent of searching is the same as that in case of having no heuristic term and becomes a circle having a center point of node s of a stating point.

In real roads, the length of routes is about one time to one and a half times as long as the length of straight lines except for special cases such as ones between the summit of a mountain and the foot of the mountain, ones on a shore of a bay, and the like.

A route having the minimum length is ordinarily obtained as an optimal route, but the route having the minimum length is not always the optimal route simply in actual roads, and searching must be performed with regard for the ease of driving. Accordingly, a more practical optimal route is required to be searched by regarding the link lengths of a narrow road as ones longer than real lengths, and defining the length per turn to the right or to the left to convert turns to lengths to be added to the cost, or the like. In those cases, g(n) becomes larger than that in case of regarding only the lengths of routes.

For example, it is supposed that the length of a link is multiplied by the following factors in accordance with the number of traffic lanes so that broad roads are given priority to be traveled by cars.

Two or more lanes on one side: one time,

One lane on one side: two times,

Narrow streets: four times.

In this case, g(n) surely becomes double or more in a search in a district in which there is no road having two or more lanes on one side. Almost all arterial roads, other than express-highways, applied to a search of long distance have many sections having one lane on one side, and have sections having two or more lanes on one side only around big cities. Therefore, g(n) is greatly increased also in a search of long distance applied to the roads of the level of arterial roads.

On the other hand, for keeping the optimality of routes, h(n) is required to be always smaller than the actual cost from the node n to the node o of a destination. In a search in which a road having two lanes on one side becomes the optimal route, since the size of g(n) does not vary in accordance with the length of routes, h(n) can not be larger than the distance of a straight line for keeping the optimality. Consequently, in a search in which a road having one lane on one side is the optimal route, the value of the weighting factor k of a heuristic term also increases in proportion to g(n), and the extent and the time of searching also increase.

Since there is no need to obtain a strictly optimal route but it is enough to obtain a quasi-optimal route sufficient for guiding a driver in route-searching, it is a practical technique to shorten the time of searching by increasing h(n) to the extent of not worsening the qualities of routes. In case of practicing a search using a hierarchical map, there are many cases where the length of a link is much longer than the distance of a straight line between nodes because in an upper ranked digital map data including only arterial roads one link includes many intersections and curves in a lower ranked digital map data. Consequently, the optimality is not easy to be decreased even if h(n) is somewhat increased. Besides, since all roads are arterial roads, it is easy to obtain good routes even if the optimal route cannot be obtained.

But, in digital map data ranked in a lower rank from a starting point to an arterial road or from an arterial road to a destination, there are some cases where the total cost becomes smaller by, for example travelling away from the destination to get to an arterial road, or by traveling through a much farther arterial road instead of traveling through a nearby arterial road. Consequently, there is a case where an apparently strange route is searched, if the optimality is not ensured. Since links are divided to be short, there are little difference between the length of links and the distance of a straight line between nodes, and then increasing h(n) is apt to decrease the optimality.

Since the conventional in-car navigation apparatus is constructed as described above, the apparatus obtains the heuristic term h(n) of an evaluation function by means of a uniform formula in every rank of a digital map data having a hierarchical construction. Consequently, it has a problem that it is difficult to shorten the time of searching while the qualities of routes are maintained.

SUMMARY OF THE INVENTION

In view of the foregoing, it is an object of the present invention to provide an in-car navigation apparatus capable of searching an optimal or a quasi-optimal route always, and capable of shortening the waiting time for obtaining a route.

It is another object of the present invention to provide an in-car navigation apparatus capable of setting the conditions of searching a road through which a car should pass, and capable of searching always an optimal or a quasi-optimal route in conformity with set conditions.

It is a further object of the present invention to provide an in-car navigation apparatus capable of setting searching conditions of whether a user gives priority to computing time necessary for searching or whether the user gives priority to the searching of the optimal route, and always capable of searching the optimal or a quasi-optimal route in conformity with set conditions.

According to the first aspect of the present invention, for achieving the above-mentioned objects, there is provided an in-car navigation apparatus comprising a searching means for searching a route from an appointed starting point to a destination through which a moving body such as a car should travel by means of a heuristic algorithm by changing a weight of a heuristic term of an evaluation function or the evaluation function itself in accordance with the ranks of digital map data stored in a map database means.

As stated above, in the in-car navigation apparatus according to the first aspect of the present invention, the searching means thereof searches a route from an appointed starting point to a destination through which a moving body such as a car should travel by means of a heuristic algorithm by changing a weight of a heuristic term of an evaluation function or the evaluation function itself in accordance with the ranks of digital map data stored in a map database means. Specifically, since the in-car navigation apparatus performs a high-speed searching in arterial roads which are almost all parts of a route and scarcely worsened in quality, and performs a searching with keeping the optimality of a route in the neighborhoods of a starting point and a destination which are extremely small parts of a route but easy to be worsened in quality, it is enabled that the qualities of routes are maintained while the time of searching is greatly shortened.

According to the second aspect of the present invention, there is provided an in-car navigation apparatus wherein the searching means thereof searches a route by making the weight of a heuristic term smaller in accordance with the largeness of the detail of a road in a rank of a digital map data.

As stated above, in the in-car navigation apparatus according to the second aspect of the present invention, the searching means thereof searches a route by making the weight of a heuristic term smaller in accordance with the largeness of the detail of a road in a rank of a digital map data. Consequently, it is enabled that the qualities of routes are maintained while the time of searching is greatly shortened similarly to the first aspect.

According to the third aspect of the present invention, there is provided an in-car navigation apparatus wherein the digital map data thereof is composed of a first rank including only major arterial roads such as an express-highway and the like, a second rank including roads major to local arterial roads inclusive, and a third rank including all roads through which general moving bodies can pass, and wherein the searching means thereof searches routes in consecutive order in each rank by decreasing the weight of the heuristic term of an evaluation function in the order from the first rank to the third rank.

As stated above, in the in-car navigation apparatus according to the third aspect of the present invention, the searching means thereof searches routes in consecutive order in each rank by decreasing the weight of the heuristic term of a synthetic evaluation function in the order of a first rank including only major arterial roads such as an expresshighway and the like, a second rank including major and local arterial roads inclusive, and a third rank including all roads through which general moving bodies can pass. Consequently, it is enabled that the qualities of routes are maintained while the time of searching is greatly shortened.

According to the fourth aspect of the present invention, there is provided an in-car navigation apparatus wherein the searching means thereof selects a rank of a digital map data from which searching is begun in accordance with the distance of a straight line from an appointed starting point to a destination.

As stated above, in the in-car navigation apparatus according to the fourth aspect of the present invention, the searching means thereof selects a rank of a digital map data from which searching is begun in accordance with the distance of a straight line from an appointed starting point to a destination. Specifically, it is preferable to search arterial roads in the second rank or search routes only in the third rank if the starting point and the destination are near. Thereby, the computing time required for searching can be shortened, and effective searching can rapidly be performed.

According to the fifth aspect of the present invention, there is provided an in-car navigation apparatus wherein the searching means thereof changes the weight of a heuristic term of an evaluation function or the evaluation function itself in conformity with searching conditions, which are set by a user, of a road through which a moving body should travel.

As stated above, in the in-car navigation apparatus according to the fifth aspect of the present invention, since the searching means thereof changes the weight of a heuristic term of an evaluation function or the evaluation function itself in conformity with searching conditions, which are set by a user of a road through which a moving body should travel, both of the keeping of the quasi-optimality of a route and the shortening of the time of searching are compatible.

According to the sixth aspect of the present invention, there is provided an in-car navigation apparatus wherein the searching means thereof changes the weight of a heuristic term of an evaluation function or the evaluation function itself in conformity with searching conditions, which are set by a user, of whether the computing time necessary for searching is given priority or whether the searching of an optimal route is given priority.

As stated above, in the in-car navigation apparatus according to the sixth aspect of the present invention, the searching means thereof changes the weight of a heuristic term of an evaluation function or the evaluation function itself in conformity with searching conditions, which are set by a user, of whether the computing time necessary for searching is given priority or whether the searching of an optimal route is given priority. Specifically, if a user attaches importance to the optimality of routes, the in-car navigation apparatus ensures the optimality of routes by decreasing the weight of the heuristic term; if the user attaches importance to the speed of searching, the apparatus can make the speed of searching fast by making the heuristic term weighted greater. Thereby, the apparatus can always search an optimal or a quasi-optimal route in response to the request of a user, and further it can shorten the time of waiting until routes are obtained.

BRIEF DESCRIPTION OF THE DRAWINGS

Further objects and advantages of the present invention can be more fully understood from the following detailed description taken in conjunction with the accompanying drawings, in which.

DETAILED DESCRIPTION OF THE PREFERRED EMBODIMENTS

Preferred embodiments of the present invention will now be described in detail with reference to the accompanying drawings.

Embodiment 1

Figure 1:
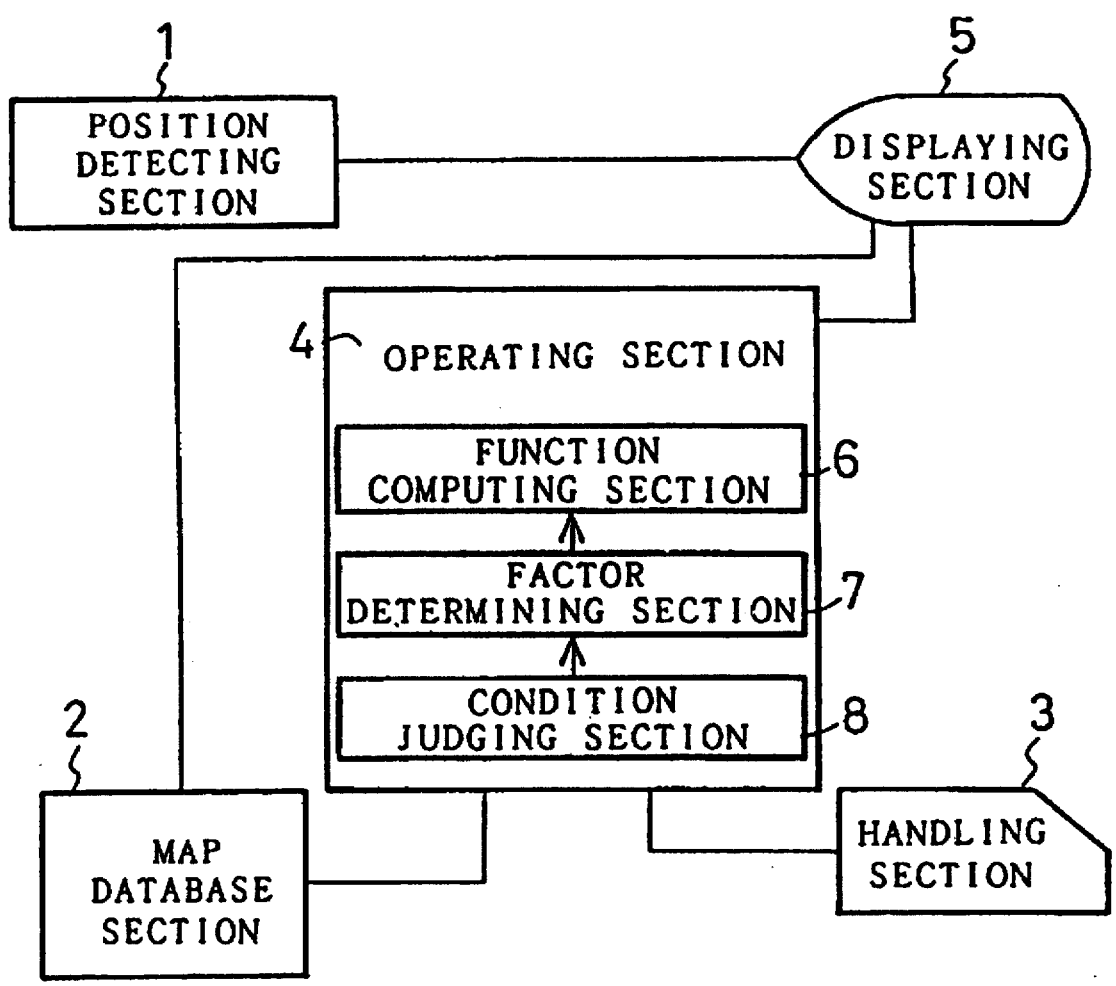
FIG. 1 is a block diagram showing the construction of the in-car navigation apparatus according to an embodiment of the present invention.

FIG. 1 is a block diagram showing the construction of the in-car navigation apparatus according to a first embodiment of the present invention. In figures, the same reference characters denote the same or equivalent parts, and thus their description will not be repeated. Reference numeral 6 denotes a function computing section provided in the operating section 4 and computing evaluation functions for route-searching in accordance with the ranks of digital map data. Reference numeral 7 denotes a factor determining section for setting the values of each factor to be used in a formula for the use of the computations of the evaluation functions of the function computing section 6. Reference numeral 8 denotes a condition judging section for informing the conditions for the determination of the weighting factors of a heuristic term h(n) of the faction determining section 7.

In operation, when a user appoints a starting point and a destination of route-searching with the handling section 3, and further when the user requests an optimal route after he set searching conditions of, for example whether toll roads are used or not, the handling section 3 requires the searching of an optimal route by informing the set contents to the operating section 4. The operating section reads in digital map data in necessary areas from the map database section 2, and searches a route by means of a heuristic algorithm so that the cost of the route from a starting point to a destination becomes almost minimum for sending the searched route to the displaying section 5. At this time, the function computing section 6 computes evaluation functions of each node by using the weighting factor of the heuristic term h(n) set by factor determining section 7. The displaying section 5 informs a user of an optimal route to a destination by displaying roads along the optimal route output from the operating section 4 with a special color, and so forth.

The digital map data stored in the map database section 2 have a hierarchy construction to be divided into a high level rank including only arterial roads and a low level rank including minute roads. In the case where the operating section 4 searches an optimal route in response to a request of a user, at first the operating section 4 searches routes from an arterial road near to the node s of a starting point to an arterial road near to the node o of a destination by means of the digital map data in the high level rank, then searches a route from the node s of the starting point to an arterial road and a route from an arterial road to the node o of the destination by means of the digital map data in the low level rank.

According to the present embodiment, the evaluation function f(n) of the node n is obtained by means of the following formula when routes are searched in each rank of the digital map data.

$$f(n)=g(n)+k_h \times h(n) \quad (3)$$

where $k_h$ is a weighting factor of the heuristic term h(n) which is defined for every rank of the digital map data.

Figure 2:
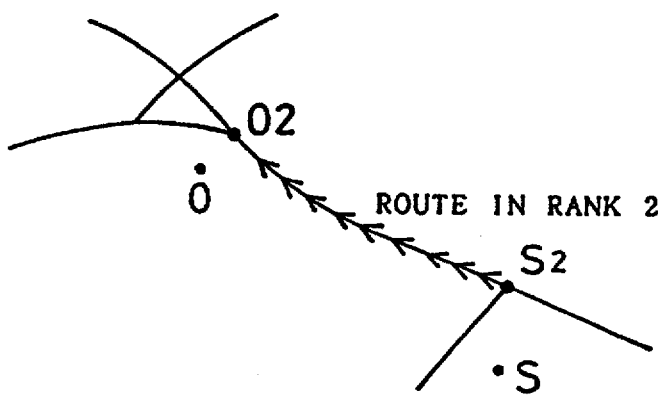
FIG. 2 is a diagram showing a tentative starting point and a tentative destination set on the digital map data of rank 2, and route to be searched at the rank 2 in the navigation apparatus shown in FIG. 1.

As shown in FIG. 2, the digital map data of an area including the node s of the starting point through the node o of the destination among the digital map data in the rank 2 including only national roads and express-highways are read out from the map database section 2, and a link nearest to the node s of the starting point among the links included in the rank 2 is selected to define the node nearer to the node s of the starting point between the nodes of both ends of the selected link as a tentative node $s_2$ of the starting point. Also, a link nearest to the node o of the destination is selected, and the node nearer to the node o of the destination between the nodes of both ends of the selected link is defined as a tentative node $o_2$ of the destination to search the route from the tentative node $s_2$ of the starting point to the tentative node $o_2$ of the destination in the digital map data in the rank 2. At that time, the evaluation function f(n) is computed in the condition that the weighting factor $k_h$ of the heuristic term h(n) in the formula (3) is set as a proper value $k_{h2}$ in the rank 2.

Figure 3:
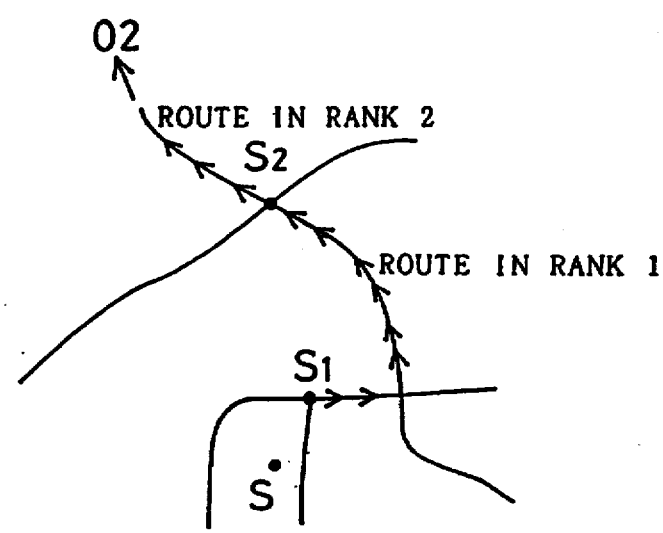
FIG. 3 is a diagram showing a tentative starting point set on the digital map data of rank 1 and route to be searched at the rank 1 on the starting point side in the navigation apparatus shown in FIG. 1.

Next, as shown in FIG. 3, the digital map data in an area including the node s of the starting point through the tentative node $s_2$ of the starting point among the digital map data in the rank 1 including major and local arterial roads inclusive are read out from the map database section 2, and a link nearest to the node s of the starting point among the links included in the rank 1 is selected to define the node nearer to the node s of the starting point between the nodes of both ends of the selected link as a tentative node $s_1$ of the starting point for searching a route from the tentative node $s_1$ of the starting point to the tentative node $s_2$ of the starting point in the digital map data in the rank 1. On that occasion, the evaluation function is computed in the condition that the weighting factor $k_h$ of the heuristic term h(n) in the formula (3) is set as a value $k_{h1}$ for rank 1.

Figure 4:
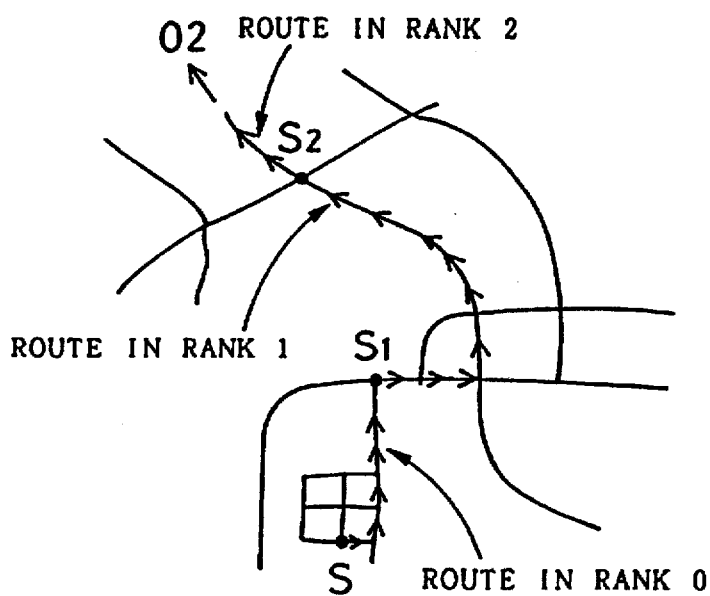
FIG. 4 is a diagram showing routes to be searched of rank 0 on the starting point side in the navigation apparatus shown in FIG. 1.

Moreover, as shown in FIG. 4, the digital map data in an area including the node s of the starting point through the tentative node $s_1$ of the starting point among the digital map data in the rank 0 including all roads through which general cars can pass are read out from the map database section 2 to search routes from the node s of the starting point to the tentative node $s_1$ of the starting point in the digital map data in the rank 0. On that occasion, the evaluation function is computed in the condition that the weighting factor $k_h$ of the heuristic term h(n) in the formula (3) is set as a value $k_{h0}$ to the rank 0.

On the destination side, similarly on the starting point side, routes are searched from a tentative node $o_2$ of the destination to a tentative node $o_1$ of the destination in the digital map data in the rank 1, and routes are searched from the tentative node $o_1$ of the destination to the node o of the destination in the digital map data in the rank 0.

In the aforementioned searching by means of ranks, supposing that, for example $k_{h2}$=2.0, $k_{h1}$=1.5, $k_{h0}$=1.0, searching is performed by means of the high-speed algorithm A in the route in the rank 2 of arterial lines where the optimality is easily maintained, and is performed by means of the algorithm A*, which can ensure the optimality in the routes in the rank 0 around the node s of the starting point or the node o of the destination where the sections are short but the optimally is difficult to maintain.

Although searching is performed from the rank 2 in the aforementioned example, if the node s of a starting point and the node o of a destination are near, it is preferable to search arterial roads in the rank 1 or search by means of only the rank 0. Even in these cases, values set to every rank in accordance with rank levels are used as the value of the weighting factor $k_h$ of the heuristic term h(n) used in the evaluation function formula (3).

Figure 5:
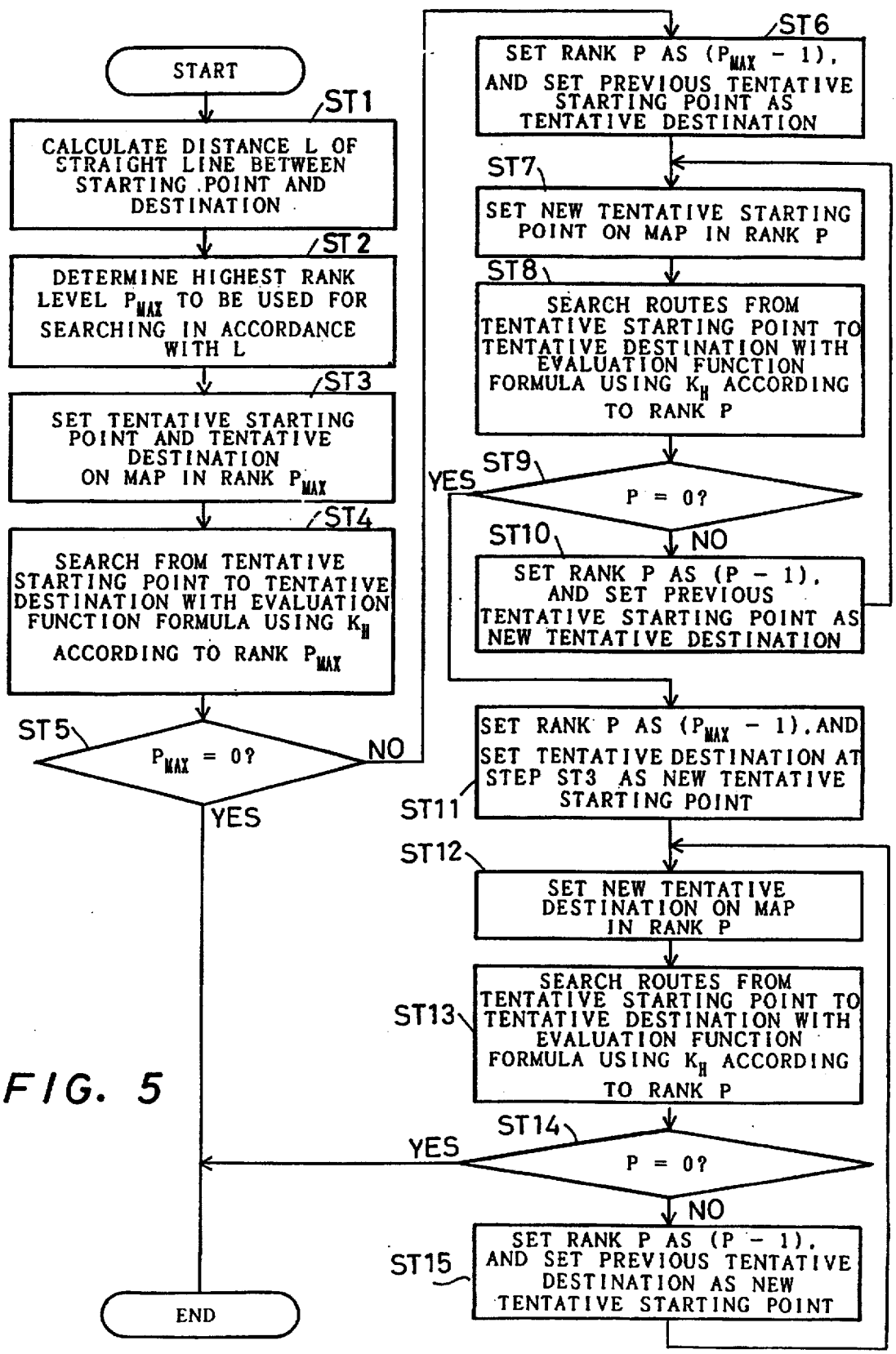
FIG. 5 is a flow chart showing an example of the processes of route-searching by using digital map data having a hierarchy construction in the in-car navigation apparatus shown in FIG. 1.

FIG. 5 is a flow chart showing the processes of route-searching in the in-car navigation apparatus in case of changing the ranks of digital map data to be searched in accordance with the distance of a straight line between the node s of a starting point and the node o of a destination. At step ST1, the distance L of a straight line between the node s of a starting point and the node o of a destination is obtained. At step ST2, a rank level $p_{max}$ to be used for searching arterial roads is determined in accordance with the distance L of a straight line. At step ST3, a tentative node s' of the starting point and a tentative node o' of the destination are determined in the digital map data in the rank of the rank level $p_{max}$. At step ST4, arterial routes (not always arterial roads) from the tentative node s' of the starting point to the tentative node o' of the destination are searched by means of the value of the weighting factor $k_h$ corresponding to the rank level $p_{max}$. If the rank level $p_{max}$ is equal to 0, the searching is finished at step ST5; if the rank level $p_{max}$ is 1 or more, low rank routes on the starting point side are searched in order from the rank level ($p_{max}$-1) to the rank level 0 at step ST6 through step ST10, and low rank routes on the destination side are searched in order from the rank level ($p_{max}$-1) to the rank level 0 at step ST11 through step ST15.

As an alternate example of the present embodiment, g(n) may be multiplied by the inverse number of the weighting factor $k_h$ instead of the heuristic term h(n) being multiplied by the weighting factor $k_h$ in the evaluation function formula (3). In this case also, advantages similar to those of the embodiment can be obtained. The evaluation function formula (3) is changed to:

$$f(n)=g(n)/k_h+h(n) \qquad (4)$$

In this case also, routes are searched by varying the values of the weighting factor $k_h$ of the heuristic term h(n) in accordance with the ranks of the digital map data. The effects of the weighting factor $k_h$ to the extent of searching is the same as those of the weighting factor $k_h$ in the formula (3).

Alternatively, the weighting of the heuristic term may be varied by varying the formula of h(n) itself for each rank instead of multiplying h(n) by the weighting factors. Ordinarily, h(n) can be obtained by the following formula.

$$h(n)=[x(n)^2+y(n)^2]^{1/2} \qquad (5)$$

where x(n) is a distance in the longitudinal direction from the node n to the node o of a destination, and y(n) is a distance in the latitudinal direction from the node n to the node o of the destination. In, for example, the high level rank in the digital map data, the heuristic term h(n) is computed by altering the formula (5) into the following formula.

$$h(n)=x(n)+y(n) \qquad (6)$$

Since the values obtained by the formula (6) are always the values obtained by the formula (5) or more, the weight of the heuristic term becomes larger in the high level rank of the digital map data in conformity with this method.

As described above, according to the present embodiment, in case of searching routes form a starting point to a destination by means of the heuristic algorithm on the basis of digital map data having a hierarchy for each rank to be searched by the alteration of the factor thereof or the alteration of the computing formula itself of the heuristic term to make the heuristic term weighted greater making the speed of searching faster in case of sections where quasi-optimal routes are easy to be obtained. Thereby, there can be obtained the advantage that an optimal or a quasi-optimal route can always be searched, and further waiting time for obtaining routes is shortened.

Embodiment 2

Figure 6:
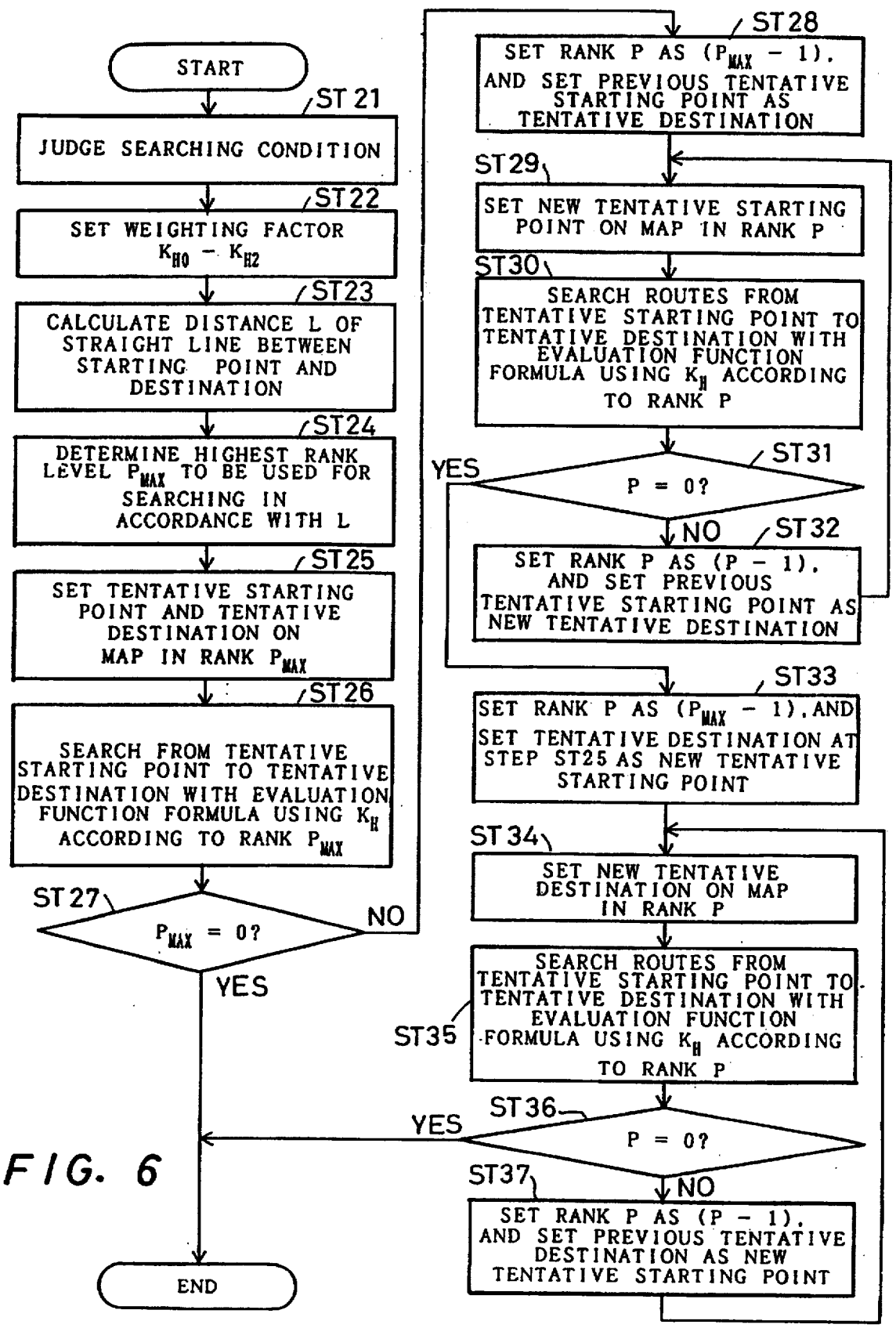
FIG. 6 is a flow chart showing an example of the processes of route-searching by using digital map data having a hierarchy construction in the in-car navigation apparatus according to another embodiment of the present invention.

FIG. 6 is a flow chart showing the processes of route-searching in the in-car navigation apparatus according to a second embodiment of the present invention. According to the embodiment, the in-car navigation apparatus is constructed not only to change the heuristic term for each rank of the digital map data, but also to change it in accordance with the set conditions for searching.

For example, a searching condition whether toll roads have priority to be used or not is considered. If toll roads have priority to be used, it is necessary to travel through free roads up to an interchange (hereinafter referred to as I.C.), and there are some cases where the car temporarily goes through a free road when it changes toll roads. If toll roads have no priority to be used, there are some cases where a destination is set on an island where the car is obliged to pass through a toll bridge; in such cases the algorithm of the in-car navigation apparatus cannot avoid using a toll road.

Accordingly, there is used a method in which searching is performed by means of the evaluation function which multiplies the free link length by a large factor if toll roads have priority to be used, and multiplies the toll link length by a large factor if toll roads have no priority to be used.

Since there are many toll roads, especially express-highways, which have two traffic lanes or more on one side and have no signals, indicators for turning right or left, or the like, the value of g(n) is not so increased in comparison with the length of routes if routes are set in the condition of giving priority to toll roads. Also, since the in-car navigation apparatus does not trace the node on free roads, but traces the nodes on toll roads, if a toll road once entered the extent of searching, the time of searching becomes shorter than that in case of not giving priority to toll roads. Consequently, in case of giving priority to toll roads, the necessity for shortening the time of searching with the sacrifice of the optimality is less in comparison with the case where toll roads have no priority.

On the other hand, if toll roads have priority to be searched, since toll roads have the road densities of road networks far smaller than those of free roads, a user has a large sense of incompatibility if the apparatus selects a wrong toll road or a route having no toll road. There are some cases where a route from a starting point to an I.C. greatly turns aside from the direction of a destination, and the degree of the demand of the optimality is consequently higher than that in the case where toll roads have no priority.

Therefore, if searching is performed in the searching condition that toll roads have priority, it is preferable to perform the searching having higher optimality by making the weight of the heuristic term less than that in the case where toll roads have no priority. For example, the value of the weighting factor $k_h$ of the heuristic term h(n) in the evaluation function formula (3) is changed in accordance with not only the rank levels of the digital map data, but also searching conditions of whether toll roads have or have not priority, and set as follows:

(1) in case of giving no priority to toll roads:

$k_{h0}=1.0, k_{h1}=1.5, k_{h2}=2.0$ (2) in case of giving priority to toll roads:

$k_{h0}=1.0, k_{h1}=1.2, k_{h2}=1.5$.

By changing the weight of the heuristic term in accordance with the searching conditions as described above, the compatibility between the maintenance of the quasi-optimality of routes and the shortening of the searching time can be realized. Other searching conditions such as whether other broad roads have priority or not, whether turning to right or left is evaded or not, or the like are conceivable, and accordingly, by setting the weight of the heuristic term appropriately to each combination of those searching conditions, the compatibility between the maintenance of the quasi-optimality of routes and the shortening of the searching time can always be realized.

Whether broad roads have priority or not is set as a searching condition, since it is required to travel through selected broad roads even if they are somewhat roundabout routes in the case where broad roads have priority, it is needed to perform the search having higher optimality. If whether turning to right or left is to be evaded or not is set as a searching condition, since it is needed to add supposed distances of several hundreds meters per turn to right or left to the cost of routes in case of evading turning to right or left, the optimality higher than that in case of not evading turning to right or left is requested. Accordingly, the weighting factors of the heuristic term h(n) are set as follows, for example:

(1) in case of giving priority to broad roads:

$k_{h0}=1.0, k_{h1}=1.2, k_{h2}=1.5$ (2) in case of giving no priority to broad roads:

$k_{h0}=1.0, k_{h1}=1.5, k_{h2}=2.0$ (3) in case of evading turning right or left:

$k_{h0}=1.0, k_{h1}=1.4, k_{h2}=1.8$ (4) in case of not evading turning right or left:

$k_{h0}=1.0, k_{h1}=1.5, k_{h2}=2.0$.

If there are a plurality of searching conditions, weighting factors previously may be prepared for every combination of searching conditions for reading in from a table. If the number of searching conditions is large, weighting factors may be produced before searching by multiplying weighting factors to each searching condition together, or by adding them up. For example, if there are three searching conditions of whether toll roads have priority or not, whether broad roads have priority or not, and whether turning right or left is evaded or not, for example the following weighting factors are prepared for each one of eight combinations of searching conditions in total, if weight factors are previously prepared.

(1) in case of giving priority to toll roads and broad roads, and evading turning right or left:

$k_{h0}=1.0, k_{h1}=1.1, k_{h2}=1.3$ (2) in case of giving priority to toll roads and broad roads, and not evading turning right or left:

$k_{h0}=1.0, k_{h1}=1.2, k_{h2}=1.4$ (3) in case of giving priority to toll roads, giving no priority to broad road, and evading turning right or left:

$k_{h0}=1.0, k_{h1}=1.2, k_{h2}=1.5$ (4) in case of giving priority to toll roads, giving no priority to broad road, and not evading turning right or left:

$k_{h0}=1.0, k_{h1}=1.3, k_{h2}=1.6$ (5) in case of giving no priority to toll roads, giving priority to broad road, and evading turning right or left:

$k_{h0}=1.0, k_{h1}=1.3, k_{h2}=1.7$ (6) in case of giving no priority to toll roads, giving priority to broad road, and not evading turning right or left:

$k_{h0}=1.0, k_{h1}=1.4, k_{h2}=1.8$ (7) in case of giving no priority to toll roads and broad road, and evading turning right or left:

$k_{h0}=1.0, k_{h1}=1.4, k_{h2}=1.9$ (8) in case of giving no priority to toll roads and broad road, and not evading turning right or left:

$k_{h0}=1.0, k_{h1}=1.5, k_{h2}=2.0$.

On the other hand, there is also a method in which weighting factors are obtained in every rank of digital map data by adding up each weighting factor previously set to each searching condition, for example as shown in follows, in accordance with searching conditions.

(1) reference factors to be bases of weighting factors in every rank of digital map data:

$k_{h0A}=1.0, k_{h1A}=1.1, k_{h2A}=1.3$ (2) in case of giving priority to toll roads:

$k_{h0B}=0.0, k_{h1B}=0.0, k_{h2B}=0.0$ (3) in case of giving no priority to toll roads:

$k_{h0B}=0.0, k_{h1B}=0.2, k_{h2B}=0.4$ (4) in case of giving priority to broad roads:

$k_{h0C}=0.0, k_{h1C}=0.0, k_{h2C}=0.0$ (5) in case of giving no priority to broad roads:

$k_{h0C}=0.0, k_{h1C}=0.1, k_{h2C}=0.2$ (6) in case of evading turning right or left:

$k_{h0D}=0.0, k_{h1D}=0.0, k_{h2D}=0.0$ (7) in case of not evading turning right or left:

$k_{h0D}=0.0, k_{h1D}=0.1, k_{h2D}=0.1$

Accordingly, weighting factors are computed for each rank of the digital map data in conformity with the following formula.

$$k_{h0}=k_{h0A}+k_{h0B}+k_{h0C}+k_{h0D}$$

$$k_{h1}=k_{h1A}+k_{h1B}+k_{h1C}+k_{h1D}$$

$$k_{h2}=k_{h2A}+k_{h2B}+k_{h2C}+k_{h2D}$$

Next, the operation of the embodiment will be described. Hereinafter, as to the case where the aforementioned three searching conditions can be set by combining each other, the processes of the route-searching of the in-car navigation apparatus of the embodiment will be described.

Figure 7:
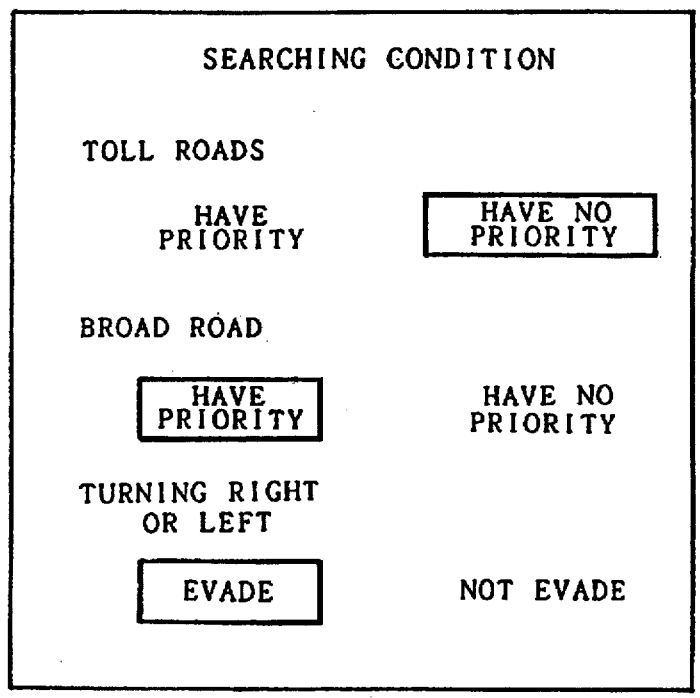
FIG. 7 is a view showing a picture for setting the conditions of searching displayed on the displaying section of the in-car navigation apparatus according to the embodiment shown in FIG. 6.

FIG. 7 is a view showing a picture for setting the conditions of searching displayed on the displaying section 5. A user sets three searching conditions shown in FIG. 7 by handling the handling section 3. In the example shown in FIG. 7, there is set a searching condition in which toll roads have no priority, broad roads have priority, and turning right or left is evaded. As shown in the flow chart of FIG. 6, at step ST21, searching conditions are at first judged for judging the searching condition out of the aforementioned eight types of combinations. Next, at step ST22, weighting factors of the heuristic term $k_{h0}-k_{h2}$ in the three ranks of the digital map data are set.

After the weighting factors were set, at step ST23, the distance L of a straight line between the node s of a starting point and the node o of a destination is obtained. At step ST24, a rank level $p_{max}$ to be used for searching arterial roads is determined in accordance with the distance L of a straight line. Next, at step ST25, a tentative node s' of the starting point and a tentative node o' of the destination are determined in the digital map data in the rank of the rank level $p_{max}$. At step ST26, arterial routes (not always arterial roads) from the tentative node s' of the starting point to the tentative node o' of the destination are searched by means of the value of the weighting factor $k_h$ corresponding to the rank level $p_{max}$. If the rank level $p_{max}$ is equal to 0, the searching is finished at step ST27; if the rank level $p_{max}$ is 1 or more, lower rank routes on the starting point side are searched in order from the rank level ($p_{max}-1$) to the rank level 0 at step ST28 through step ST32, and lower rank routes on the destination side are searched in order from the rank level ($p_{max}-1$) to the rank level 0 at step ST33 through step ST37.

Not only by varying the weighting factor of the heuristic term to every rank, but also by varying the heuristic term in accordance with searching conditions as shown in the aforementioned examples, it is made to be possible to shorten the searching time effectively while keeping the optimality of routes.

Embodiment 3

Figure 8:
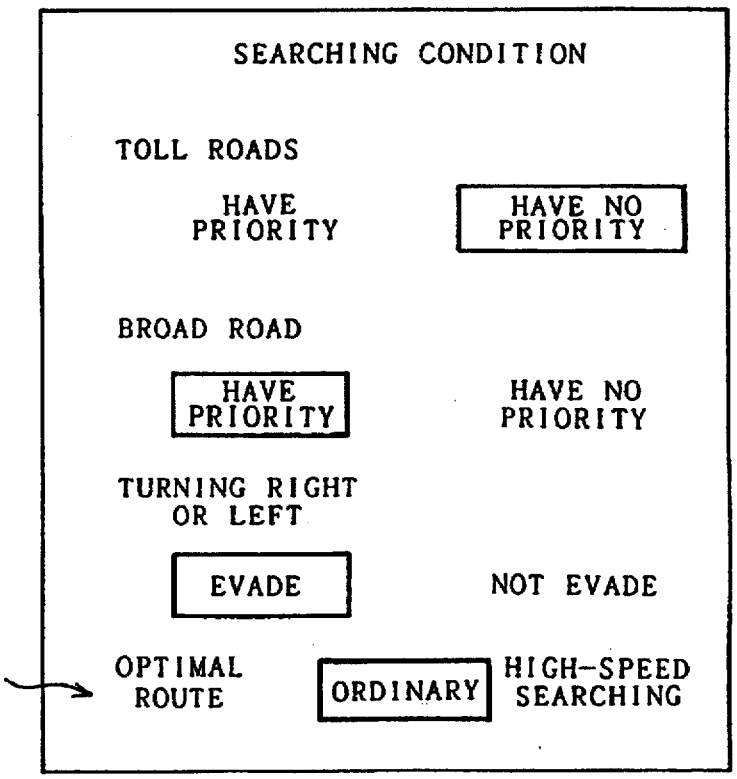
FIG. 8 is a view showing a picture for setting the conditions of searching displayed on the displaying section of the in-car navigation apparatus according to further embodiment of the present invention.
Figure 9:
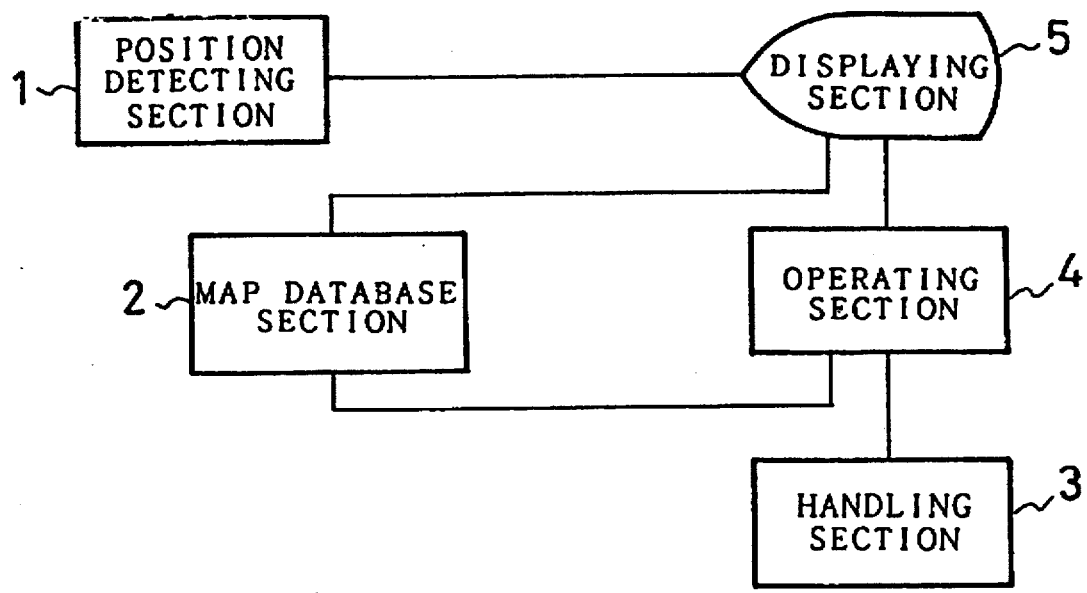
FIG. 9 is a block diagram showing the construction of a conventional in-car navigation apparatus.
Figure 10:
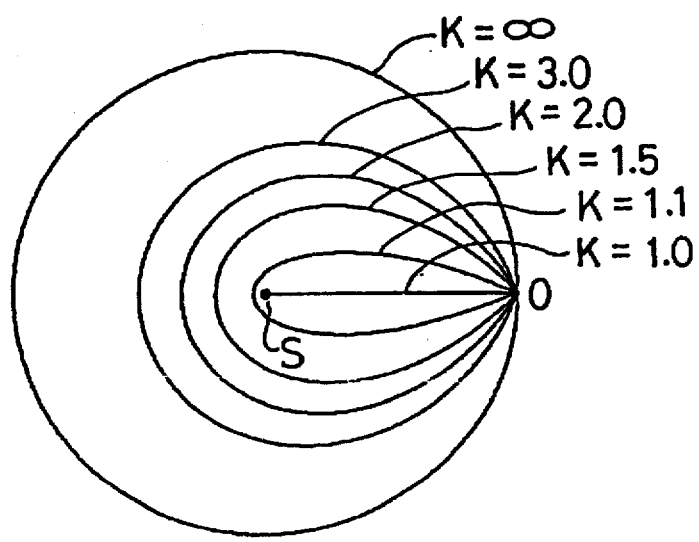
FIG. 10 is a diagram notionally showing the transition of the extent of searching in the case where the weight of cost in heuristic searching.

FIG. 8 is a view showing a picture for setting the conditions of searching in the in-car navigation apparatus according to a third embodiment of the present invention. In the figure, reference numeral 20 denotes items for setting the searching conditions related to the nature of route-searching.

In operation, the processes of route-searching can be executed in conformity with the flow chart shown in FIG. 6 in this embodiment, too. Although conditions of roads to be travelled are set as searching conditions, and the operating section 4 automatically sets the weighting factor of the heuristic term in the aforementioned embodiment 2, by adding the selection of whether the speed of searching is attached importance or whether the optimality of routes is attached importance, as shown in FIG. 8, and by changing the value of the weighting factor $k_h$ of the heuristic term in accordance with whether speed or optimality is attached importance, the weight of the heuristic term can also be changed in accordance with the preference of a user.

For example, if the user select "OPTIMAL ROUTE", which attaches importance to the optimality, all of the weighting factors $k_{h0}-k_{h2}$ of the heuristic term in the aforementioned three ranks of the digital map data shown in the embodiment 1 are 1.0. If the user select "ORDINARY", the weighting factors $k_{h0}-k_{h2}$ of the heuristic term are equal to the weighting factors of the heuristic term in any one case of the eight types of the combinations of three searching conditions shown in the aforementioned embodiment 2; if the user select "HIGH-SPEED SEARCHING", which attaches importance to the speed of searching, the weighting factors $k_{h0}-k_{h2}$ of the heuristic term are equal to one and half times as large as the weighting factors of the heuristic term for each of the eight types of the combinations of three searching conditions shown in the aforementioned embodiment 2.

If re-searching is requested for the routes searched with attaching importance to speed, it is preferable to automatically change the searching condition to one which attaches importance to the optimality.

As described above, according to the present embodiment, when routes from a starting point to a destination are searched by means of the heuristic algorithm on the basis of the digital map data having a hierarchy construction, the weight of the heuristic term is varied by altering the weight of the heuristic term by the alteration of factors or the computing formula of the heuristic term itself in conformity with the set searching conditions, for ensuring the optimality of routes by making the weight of the heuristic term less in case of attaching importance to the optimality of routes, and for making the weight of the heuristic term greater to make searching speed faster in case of attaching importance to the searching speed. Thereby, the embodiment has an advantage that an optimal or a quasi-optimal route can always be searched in response to the request of a user, and further that waiting time for obtaining routes is shortened.

It will be appreciated from the foregoing description that, according to the first aspect of the present invention, the in-car navigation apparatus is constructed to comprise a searching means for searching a route from an appointed starting point to a destination through which a moving body such as a car should travel by means of a heuristic algorithm by changing the weight of a heuristic term of an evaluation function or the evaluation function itself in accordance with the ranks of digital map data stored in a map database means, and consequently, the in-car navigation apparatus ensures the optimality of routes by making the heuristic term less where the optimality of routes is attached importance, and can make the searching speed faster by making the heuristic term less where quasi-optimal routes are easy to be obtained, thereby the apparatus has an advantage that the optimal or a quasi-optimal route can always be searched, and further that waiting time for obtaining routes can be shortened.

Furthermore, according to the second aspect of the present invention, the in-car navigation apparatus is constructed so that the searching means thereof searches a route by making the weight of a heuristic term less in accordance with the largeness of detail of a road in a rank of a digital map data, and consequently, the apparatus has an advantage that the qualities of routes can be maintained while the time of searching is greatly shortened.

Furthermore, according to the third aspect of the present invention, the in-car navigation apparatus is constructed so that the digital map data thereof is composed of a first rank including only major arterial roads such as an express-highway and the like, a second rank including roads major and local arterial roads inclusive, and a third rank including all roads through which general moving bodies can pass, and that the searching means thereof searches routes in consecutive order in each rank by decreasing the weight of the heuristic term of an evaluation function in the order from the first rank to the third rank, and consequently, the apparatus has an advantage that the qualities of routes can be maintained while the time of searching is greatly shortened.

Furthermore, according to the fourth aspect of the present invention, the in-car navigation apparatus is constructed so that the searching means thereof selects a rank of a digital map data from which searching is begun in accordance with the distance of a straight line from an appointed starting point to a destination, and consequently, the apparatus has an advantage that the computing time required for searching can be shortened, and that effective searching can rapidly be performed.

Furthermore, according to the fifth aspect of the present invention, the in-car navigation apparatus is constructed so that the searching means thereof changes the weight of a heuristic term of an evaluation function or the evaluation function itself in conformity with searching conditions, which are set by a user, of a road through which a moving body should travel, and consequently, the in-car navigation apparatus ensures the optimality of routes by making the heuristic term less when the optimality of routes is attached importance, and can make the searching speed faster by making the heuristic term more when quasi-optimal routes are easy to be obtained, thereby the apparatus has an advantage that the optimal or a quasi-optimal route can always be searched, and further that waiting time for obtaining routes can be shortened.

Furthermore, according to the sixth aspect of the present invention, the in-car navigation apparatus is constructed so that the searching means thereof changes the weight of a heuristic term of an evaluation function or the evaluation function itself in conformity with searching conditions, which are set by a user, of whether the computing time necessary for searching is given priority or whether the searching of an optimal route is given priority, and consequently, the apparatus can always search an optimal or a quasi-optimal route in response to the preference or a request of a user, and further it can shorten the time of waiting until the route is obtained.

While preferred embodiments of the present invention have been described using specific terms, such description is for illustrative purposes only, and it is to be understood that changes and variations may be made without departing from the spirit or scope of the following claims.

What is claimed is:

1. An in-car navigation apparatus comprising:
    a map database storing digital map data composed of at least two ranks different in degree of road detail; and
    searching means for searching a route from an appointed starting point to a destination through which a moving body should travel by means of a heuristic algorithm by changing a relative weight of a heuristic term of an evaluation function in accordance with said ranks of the digital map data stored in said map database.

2. A navigation system for determining a route to be travelled by a moving body going from starting point S to destination point T, comprising:
    a map database containing a plurality of maps having different rank numbers; and
    an operating section for selecting one of said ranked maps from said map database and for determining a section of said route from point S to point T by calculating an evaluation value from an evaluation function $f(n)$, said evaluation function $f(n)$ including a calculated cost term $g(n)$ and a heuristic term $h(n)$, the weight of said heuristic term $h(n)$ relative to said calculated cost term $g(n)$ being set in accordance with the rank number of said selected map.

3. A navigation system according to claim 2, wherein said operating section changes the weight of the heuristic term $h(n)$ relative to the cost term $g(n)$ in conformity with searching conditions regarding a road type through which the moving body should travel.

4. A navigation system according to claim 2, wherein said operating section changes the weight of the heuristic term $h(n)$ relative to the cost term $g(n)$ in conformity with searching conditions regarding whether computing time necessary for searching is given priority or whether searching of an optimal route is given priority.

5. A navigation system according to claim 2, wherein said operating section selects a rank of map data from which searching is begun in accordance with a distance of a straight line from the appointed starting point S to the destination point T.

6. A navigation system according to claim 2, wherein said map data stored in said map database is composed of a first rank including only major arterial roads, a second rank including major and local arterial roads, and a third rank including all passable roads, and wherein said operating section searches routes in consecutive rank order by decreasing the weight of the heuristic term $h(n)$ relative to the cost term $g(n)$ in order from the first rank to the third rank.

7. A navigation system according to claim 2, wherein said operating section searches a route by making the weight of the heuristic term $h(n)$ relative to the cost term $g(n)$ small in accordance with largeness of detail of a road in a rank of the map data.

8. A navigation system as defined in claim 2, wherein the weight of said heuristic term $h(n)$ relative to said cost term $g(n)$ is set by multiplying $h(n)$ by a weighting factor $k_h$ which changes for different map rank numbers.

9. A navigation system as defined in claim 2, wherein the weight of said heuristic term $h(n)$ relative to said cost term $g(n)$ is set by multiplying said cost term $g(n)$ by the inverse of a weighting factor $k_h$ which changes for different map rank numbers.

10. A navigation system as defined in claim 2, wherein the weight of said heuristic term $h(n)$ relative to said cost term $g(n)$ is set by calculating $h(n)$ with a formula which changes for different map rank numbers.

11. A navigation system as defined in claim 2, wherein said operating section changes the weight of said heuristic term $h(n)$ relative to said cost term $g(n)$ in conformity with a searching condition, said searching condition including an indication that toll roads are or are not preferred.

12. A navigation system as defined in claim 2, wherein said operating section changes the weight of said heuristic term $h(n)$ relative to said cost term $g(n)$ in conformity with a searching condition, said searching condition including an indication that wide roads are or are not preferred.

13. A method for navigating a route to be travelled by a moving body going from starting point S to destination point T, comprising the steps of:
    (a) storing in a database a plurality of maps having different rank numbers;
    (b) selecting one of said ranked maps from said map database;
    (c) determining a section of said route from point S to point T by calculating an evaluation value from an evaluation function f(n), said evaluation function f(n) including a calculated cost term g n) and a heuristic term h(n), the weight of said heuristic term h(n) relative to said calculated cost term g(n) being set in accordance with the rank number of said selected map; and (d) repeating said steps (b) and (c) until a desirable complete route from point S to point T is determined.

14. A method for navigating as defined in claim 13, wherein the weight of said heuristic term h(n) relative to said cost term g(n) is set by multiplying h(n) by a weighting factor $k_h$ which changes for different map rank numbers.

15. A method for navigating as defined in claim 13, wherein the weight of said heuristic term h(n) relative to said cost term g(n) is further set in accordance with whether computing time or the determination of an optimal route is given priority.

16. A method for navigating as defined in claim 13, wherein the rank of the map initially selected in step (b) is determined in accordance with the distance of a straight line form starting point S to destination point T.

17. A method for navigating as defined in claim 13, wherein the weight of said heuristic term h(n) relative to said cost term g(n) is further set in accordance with a selected road type preference.

18. A method for navigating as defined in claim 13, wherein the weight of said heuristic term h(n) relative to said cost term g(n) is further set in accordance with the level of road detail.

19. A method for navigating as defined in claim 13, wherein said ranked maps includes; a map having a high rank which contains only major arterial roads, a map having an intermediate rank which contains both major and local arterial roads, and a map having a low rank which includes all passable roads, said steps (b) and (c) starting with a high ranked map and progressing consecutively through lower ranked maps until a desirable complete route from starting point S to destination point T is determined, the weight of said heuristic term h(n) relative to said cost term g(n) decreasing with a decrease in map rank.

* * * * *